(12) United States Patent
Onozawa et al.

(10) Patent No.: US 12,346,546 B2
(45) Date of Patent: Jul. 1, 2025

(54) INFORMATION PROCESSING DEVICE AND INFORMATION PROCESSING PROGRAM

(71) Applicant: FUJIFILM CORPORATION, Tokyo (JP)

(72) Inventors: Yuji Onozawa, Kanagawa (JP); Tatsuo Fukushima, Kanagawa (JP); Takafumi Haruta, Kanagawa (JP); Yohei Makino, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 172 days.

(21) Appl. No.: 18/264,253

(22) PCT Filed: Feb. 1, 2022

(86) PCT No.: PCT/JP2022/003876
§ 371 (c)(1),
(2) Date: Aug. 4, 2023

(87) PCT Pub. No.: WO2022/176603
PCT Pub. Date: Aug. 25, 2022

(65) Prior Publication Data
US 2024/0295956 A1 Sep. 5, 2024

(30) Foreign Application Priority Data

Feb. 17, 2021 (JP) .................. 2021-023754

(51) Int. Cl.
*G06F 3/0488* (2022.01)
*G06F 3/04847* (2022.01)

(52) U.S. Cl.
CPC ........ *G06F 3/04847* (2013.01); *G06F 3/0488* (2013.01)

(58) Field of Classification Search
CPC ...................................... G06F 3/0488
(Continued)

(56) References Cited

U.S. PATENT DOCUMENTS 7,705,833 B2 * 4/2010 Kim .................. H04M 1/72469
715/779
7,814,419 B2 * 10/2010 Fabritius ............... G06F 3/0488
715/764

(Continued)

FOREIGN PATENT DOCUMENTS

JP 5617783 B2 11/2014
JP 2020-004255 A 1/2020

*Primary Examiner* — Reza Nabi
(74) *Attorney, Agent, or Firm* — SOLARIS Intellectual Property Group, PLLC

(57) ABSTRACT

According to the present invention, an instruction to execute a function is completed and the function is executed by performing a movement operation, such as dragging or sliding a slide mark to an end portion of a movement area while touching the slide mark with a finger and then releasing the finger. Continuing the touch on the slide mark with the finger causes a duration of the touching state to be measured, and the slide mark is displayed in such a way as to move along the movement area as time elapses. When the duration of the touching state in which the finger touches the slide mark reaches a predetermined time, and the slide mark reaches the end portion of the movement area, an instruction to execute the function is issued when the finger is released.

12 Claims, 15 Drawing Sheets

(58) Field of Classification Search
USPC .......................................................... 715/833
See application file for complete search history.

(56) References Cited

U.S. PATENT DOCUMENTS

| | | | | |
|---|---|---|---|---|
| 8,665,225 | B2* | 3/2014 | Herz | G06F 3/0488 |
| | | | | 345/173 |
| 9,317,183 | B2* | 4/2016 | Kim | G06F 3/04817 |
| 10,101,898 | B2* | 10/2018 | Ameline | G06F 3/0488 |
| 2011/0025632 | A1* | 2/2011 | Lee | G06F 3/0482 |
| | | | | 345/173 |
| 2012/0131497 | A1* | 5/2012 | Jitkoff | G06F 3/04883 |
| | | | | 715/786 |
| 2013/0042199 | A1* | 2/2013 | Fong | G06F 3/0488 |
| | | | | 715/780 |
| 2020/0007749 | A1* | 1/2020 | Izuoka | G06F 3/04847 |
| 2020/0183527 | A1* | 6/2020 | Harrison | G06F 3/04883 |
| 2024/0295956 | A1* | 9/2024 | Onozawa | G06F 3/0482 |

\* cited by examiner

Y DIRECTION
X DIRECTION

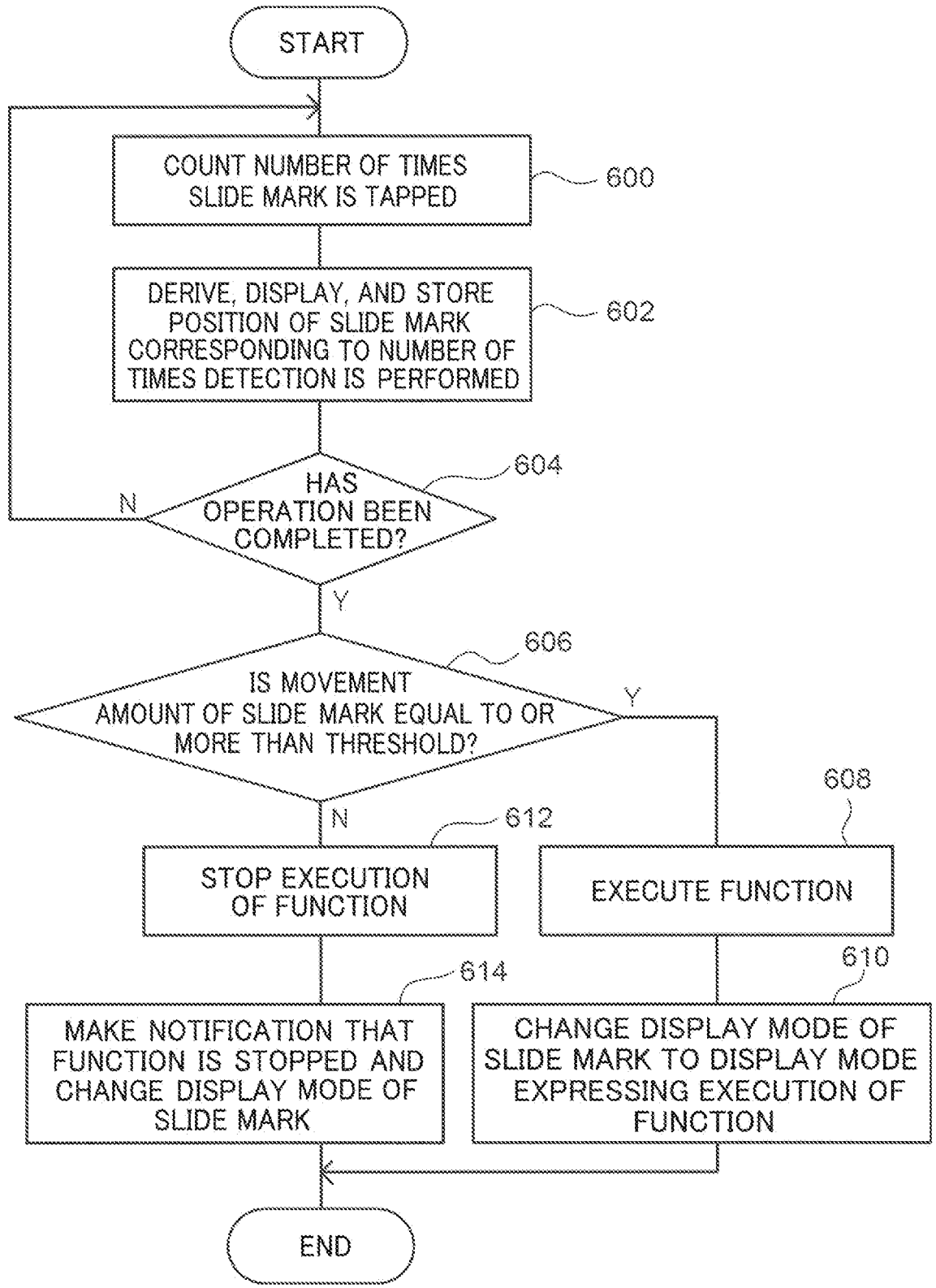

INFORMATION PROCESSING DEVICE AND INFORMATION PROCESSING PROGRAM

TECHNICAL FIELD

The present disclosure relates to an information processing device and an information processing program.

BACKGROUND ART

Japanese Patent Application Laid-Open (JP-A) No. 2020-4255 proposes that a specific function is executed according to a first touch operation on a touch operation member of an electronic device in a case in which the touch operation member in an enabled state, control is performed in such a way as not to execute the specific function even when the first touch operation is performed on the touch operation member in a case in which the touch operation member is in a disabled state, and control is performed in such a way as to switch from the disabled state to the enabled state according to a second touch operation performed on a first region farther from a grip portion than a second region on a touch detection surface of the touch operation member in a case in which the touch operation member is in the disabled state. Specifically, an operation panel of a digital camera is provided with a normal mode and an erroneous operation mode. In the normal mode, processing is executed by a tapping operation. In the erroneous operation mode, processing is not executed by the tapping operation to prevent an erroneous operation.

Japanese Patent Publication (JP-B) No. 5617783 proposes that, when it is determined that a vehicle is in a standstill state, it is determined that a determination operation has been performed in a case in which an operation corresponding to an operation assigned to the standstill state is detected on a touch pad, and on the other hand, when it is determined that the vehicle is in a traveling state, it is determined that the determination operation has been performed in a case in which an operation corresponding to an operation assigned to the traveling state is detected on the touch pad. Specifically, a traveling speed is recognized on an operation panel of an in-vehicle navigation device, and the processing is executed by a tapping operation when the traveling speed corresponds to the standstill state. However, during traveling, a parameter for a gesture of an operation including tapping and sliding, such as the number of times the operation is made, an operation distance, or an operation time, is measured, and the processing is executed only when the parameter becomes equal to or more than an assumed threshold, thereby reducing erroneous operations.

SUMMARY OF INVENTION

Technical Problem

As a method of executing processing by sliding a part of a button instead of performing a simple single tapping operation is used, erroneous operations can be reduced as compared with a case of using a single tapping operation. However, it may be difficult for a user who is not accustomed to the sliding operation to perform the sliding operation.

Therefore, an object of the present disclosure is to provide an information processing device and an information processing program capable of providing, in addition to a sliding operation, an operation that is not a single tapping operation and can be operated by a user who is not accustomed to the sliding operation.

Solution to Problem

In order to achieve the above object, an information processing device according to a first aspect includes a processor, in which the processor executes processing of: displaying, on a display unit, an operation part that receives an operation by a user; displaying, in a case in which a movement operation of moving the operation part in a selected state is received, the operation part in such a way as to move while following the movement operation, and issuing an instruction to execute a predetermined function by moving operation part to a predetermined position by the movement operation and then completing the movement operation; and issuing an instruction to execute the predetermined function in a case in which a predetermined operation that is different from each of the movement operation and a single tapping operation performed by the user on the operation part or an area in which the operation part is movable, and includes an operation of selecting at least one of the operation part or the area in which the operation part is movable is received.

An information processing device according to a second aspect is the information processing device according to the first aspect, in which the predetermined operation is an operation of continuing a touching state in which a finger touches the operation part or the area in which the operation part is movable for a predetermined time or more.

An information processing device according to a third aspect is the information processing device according to the second aspect, in which the predetermined operation is an operation performed on the operation part.

An information processing device according to a fourth aspect is the information processing device according to the third aspect, in which the processor executes processing of displaying the operation part in such a way as to move while the finger touches the operation part, and issuing an instruction to execute the predetermined function when the movement is completed.

An information processing device according to a fifth aspect is the information processing device according to the fourth aspect, in which the processor displays the operation part at an original position and stops execution of the function in a case in which the finger is released from the operation part before the movement is completed.

An information processing device according to a sixth aspect is the information processing device according to the first aspect, in which the predetermined operation is an operation of tapping a plurality of positions.

An information processing device according to a seventh aspect is the information processing device according to the sixth aspect, in which one of the plurality of positions is the operation part, and another position is a movement area in which the operation part moves.

An information processing device according to an eighth aspect is the information processing device according to the first aspect, in which the predetermined operation is an operation of tapping a plurality of positions a plurality of times.

An information processing device according to a ninth aspect is the information processing device according to the eighth aspect, in which the processor executes processing of displaying the operation part in such a way as to move according to a distance between two tapped points, and issuing an instruction to execute the predetermined function when the movement is completed.

An information processing device according to a tenth aspect is the information processing device according to the first aspect, in which the predetermined operation is an operation of tapping the operation part or the area in which the operation part is movable and then tapping another portion.

An information processing device according to an eleventh aspect is the information processing device according to the tenth aspect, in which the predetermined operation is an operation of tapping the operation part or the area in which the operation part is movable and then tapping a displayed confirmation screen.

An information processing device according to a twelfth aspect is the information processing device according to the first aspect, in which the predetermined operation is an operation of tapping the operation part or the area in which the operation part is movable with a finger a plurality of times.

An information processing device according to a thirteenth aspect is the information processing device according to the twelfth aspect, in which the processor executes processing of displaying the operation part in such a way as to move according to the number of times of tapping, and issuing an instruction to execute the predetermined function when the movement is completed.

An information processing program according to a fourteenth aspect causes a computer to execute processing of: displaying, on a display unit, an operation part that receives an operation by a user; displaying, in a case in which a movement operation of moving the operation part in a selected state is received, the operation part in such a way as to move while following the movement operation, and issuing an instruction to execute a predetermined function by moving operation part to a predetermined position by the movement operation and then completing the movement operation; and issuing an instruction to execute the predetermined function in a case in which a predetermined operation that is different from each of the movement operation and a single tapping operation performed by the user on the operation part or an area in which the operation part is movable, and includes an operation of selecting at least one of the operation part or the area in which the operation part is movable is received.

Advantageous Effects of Invention

According to the first aspect, it is possible to provide the information processing device capable of providing, in addition to a sliding operation, an operation that is not a single tapping operation and can be operated by a user who is not accustomed to the sliding operation.

According to the second aspect, an erroneous operation can be suppressed as compared with the case of the single tapping operation.

According to the third aspect, an erroneous operation can be suppressed as compared with the case of receiving an operation of continuing the touching state in which the finger touches for a predetermined time or more even for the area where the operation part is movable.

According to the fourth aspect, it is easy to visually determine that the predetermined function is executed.

According to the fifth aspect, it is possible to stop the execution of the function even during the operation of continuing the touching state in which the finger touches the operation part or the area in which the operation part is movable for a predetermined time or more.

According to the sixth aspect, an erroneous operation can be suppressed as compared with the case of an operation of tapping one portion.

According to the seventh aspect, an erroneous operation can be suppressed as compared with a case in which a portion to be tapped is not divided.

According to the eighth aspect, an erroneous operation can be suppressed as compared with the case of an operation of tapping one portion once.

According to the ninth aspect, an erroneous operation can be suppressed as compared with the case of an operation of tapping two portions once.

According to the tenth aspect, an erroneous operation can be suppressed as compared with the case of an operation of only tapping the operation part or the area in which the operation part is movable.

According to the eleventh aspect, the user can easily recognize that the function is executed as compared with a case in which the screen is not displayed.

According to the twelfth aspect, an erroneous operation can be suppressed as compared with the case of the single tapping operation.

According to the thirteenth aspect, it is easy to visually determine that the predetermined function is executed.

According to the fourteenth aspect, it is possible to provide the information processing program capable of providing, in addition to the sliding operation, an operation that is not the single tapping operation and can be operated by a user who is not accustomed to the sliding operation.

BRIEF DESCRIPTION OF DRAWINGS

FIG. 16 is a flowchart showing a flow of an example of sliding substitution processing in the image forming device according to the fifth embodiment.

DESCRIPTION OF EMBODIMENTS

Figure 1:
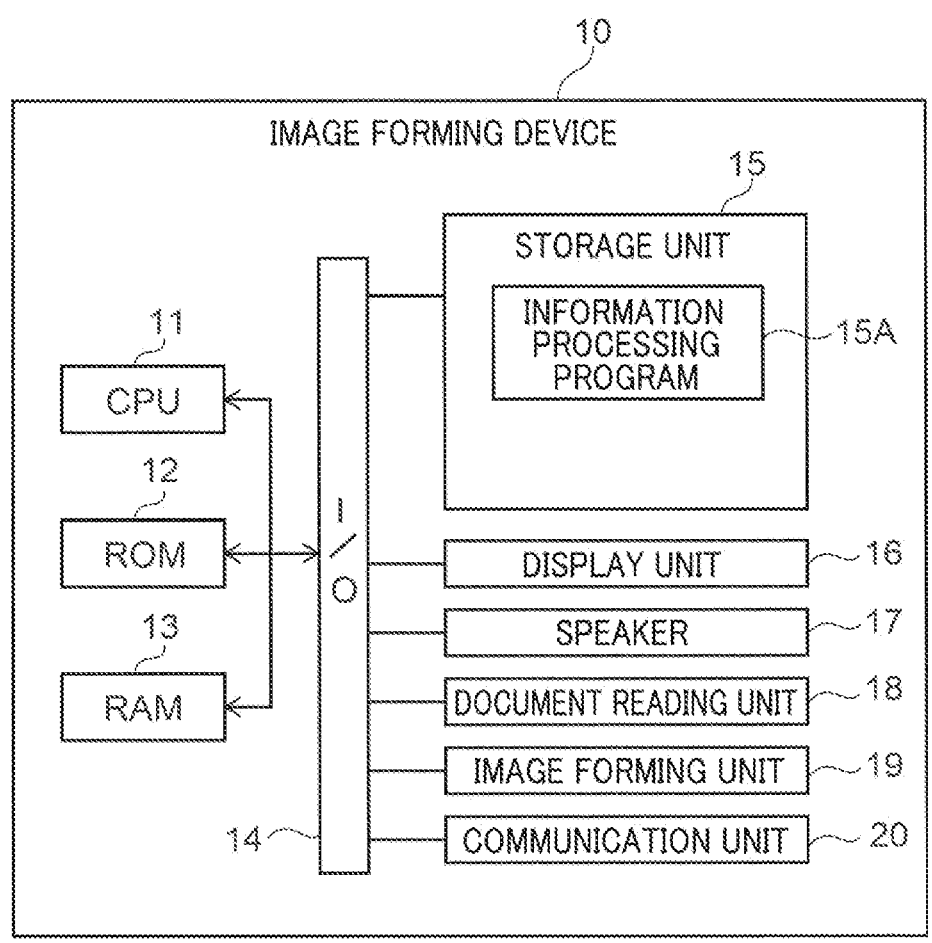
FIG. 1 is a block diagram showing an example of an electrical configuration of an image forming device according to a first embodiment.

Hereinafter, an example of a mode for carrying out the technology of the disclosure will be described in detail with reference to the drawings. Constituent elements and processing responsible for the same operation and function are denoted by the same reference numerals, and an overlapping description thereof may be omitted, if appropriate. Each drawing is only schematically illustrated enough to sufficiently understand the technology of the disclosure. The technology of the disclosure is not limited to examples in the drawings. In addition, in the present embodiment, a description of configurations that are not directly related to the technology of the disclosure or well-known configurations may be omitted.

In the embodiment, an example of an information processing device that executes processing of issuing an instruction to execute a predetermined function according to a manual operation of a user (hereinafter, referred to as a user operation) on an operation part such as a mark displayed on a display unit such as a display will be described.

In the disclosure, the "operation part" is a concept including an image displayed on the display unit such as a display. The "movement operation" is an operation of moving in a state in which the operation part is selected, and is a concept including an instruction position being changed while being sequentially moved according to the user operation. Examples of the movement operation include a user operation of moving while touching the display unit such as a display, for example, a user operation in which a touching operation by the user is continued from a start point to an end point, such as dragging, sliding, swiping, or flicking. The "start of the movement operation" is the start of the instruction from the user and may include a user operation of starting touching of the display unit such as a display. The "completion of the movement operation" is the end of the instruction from the user and may include a user operation of releasing the touch.

First Embodiment

FIG. 1 is a block diagram showing an example of an electrical configuration of an image forming device 10 according to a first embodiment.

As shown in FIG. 1, the image forming device 10 according to the present embodiment includes a central processing unit (CPU) 11 as an example of a processor, a read only memory (ROM) 12, a random access memory (RAM) 13, an input/output interface (I/O) 14, a storage unit 15, a display unit 16, a speaker 17, a document reading unit 18, an image forming unit 19, and a communication unit 20.

The image forming device 10 is an example of an information processing device. Examples of the information processing device according to the present embodiment include, in addition to the image forming device 10, general information processing devices having a UI screen adopting a touch panel system, such as a smartphone, a tablet terminal, and a game device.

Each of the CPU 11, the ROM 12, the RAM 13, and the I/O 14 is connected via a bus. The functional units including the storage unit 15, the display unit 16, the speaker 17, the document reading unit 18, the image forming unit 19, and the communication unit 20 are connected to the I/O 14. These functional units can communicate with the CPU 11 via the I/O 14.

The CPU 11, the ROM 12, the RAM 13, and the I/O 14 are included in a control unit. The control unit may be configured as a sub control unit that controls a partial operation of the image forming device 10, or may be configured as a part of a main control unit that controls the entire operation of the image forming device 10. For some or all of the blocks of the control unit, for example, an integrated circuit such as a large scale integration (LSI) or an integrated circuit (IC) chip set is used. An individual circuit may be used for each of the blocks, or a circuit in which some or all of the blocks are integrated may be used. The respective blocks may be provided integrally with each other, or some of the blocks may be provided separately. Some of the respective blocks may be provided separately. The integration of the control unit is not limited to the LSI, and a dedicated circuit or a general-purpose processor may be used.

For example, a hard disk drive (HDD), a solid state drive (SSD), a flash memory, or the like is used as the storage unit 15. The storage unit 15 stores an information processing program 15A according to the present embodiment. The information processing program 15A may be stored in the ROM 12.

The information processing program 15A may be installed in the image forming device 10 in advance, for example. The information processing program 15A may be implemented by being stored in a nonvolatile storage medium or distributed via a network, and installed in the image forming device 10, if appropriate. Examples of the nonvolatile storage medium include a compact disc read only memory (CD-ROM), a magneto-optical disk, an HDD, a digital versatile disc read only memory (DVD-ROM), a flash memory, and a memory card.

For example, a liquid crystal display (LCD), an organic electro luminescence (EL) display, or the like is used as the display unit 16. The display unit 16 integrally includes a touch panel, and receives various input operations from the user via the touch panel. For example, a capacitive method may be employed for the touch panel. Another method such as a pressure-sensitive method other than the capacitive method may be employed for the touch panel. In addition, the speaker 17 outputs a preset sound effect and the like according to various input operations.

The document reading unit 18 takes in, one by one, documents placed on a feeding tray of an automatic document feeder (not shown) provided at an upper portion of the image forming device 10 and optically reads the taken-in document to obtain image information. Alternatively, the document reading unit 18 optically reads a document placed on a document platen such as a platen glass to obtain image information.

The image forming unit 19 forms, on a recording medium such as paper, an image based on image information obtained by reading performed by the document reading unit 18 or image information obtained from an external personal computer (PC) or the like connected via the network. An electrophotographic method is described as an example of a method of forming an image in the present embodiment, but other methods such as an inkjet method may be adopted.

In a case in which the method of forming an image is the electrophotographic method, the image forming unit 19 includes a photosensitive drum, a charging unit, an exposure unit, a developing unit, a transfer unit, and a fixing unit. The charging unit applies a voltage to the photosensitive drum to charge the surface of the photosensitive drum. The exposure unit forms an electrostatic latent image on the photosensitive drum by exposing the photosensitive drum charged by the charging unit with light corresponding to image information. The developing unit forms a toner image on the photosensitive drum by developing the electrostatic latent image formed on the photosensitive drum with toner. The transfer unit transfers the toner image formed on the photosensitive drum to a recording medium. The fixing unit fixes the toner image transferred onto the recording medium by heating and pressing.

The communication unit 20 is connected to a network such as the Internet, a local area network (LAN), or a wide area network (WAN), and can communicate with an external PC or the like via the network.

Figure 2:
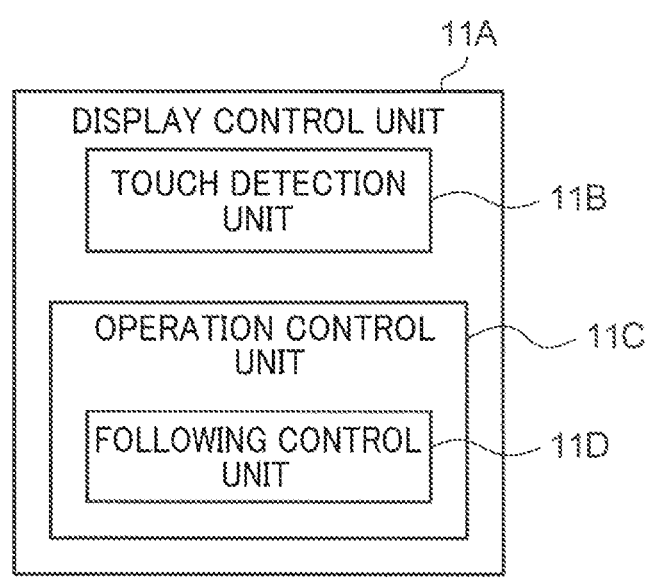
FIG. 2 is a block diagram showing an example of a functional configuration of the image forming device according to the first embodiment.

The CPU 11 of the image forming device 10 according to the present embodiment functions as each unit shown in FIG. 2 by writing in the RAM 13 and executing the information processing program 15A stored in the storage unit 15.

FIG. 2 is a block diagram showing an example of a functional configuration of the image forming device 10 according to the first embodiment.

As shown in FIG. 2, the CPU 11 of the image forming device 10 according to the present embodiment functions as a display control unit 11A. The display control unit 11A includes a touch detection unit 11B and an operation control unit 11C.

The touch detection unit 11B detects a touch and a touch position of a finger of the user on an operation part displayed as an image on the display unit 16. Then, the operation control unit 11C has a control function of controlling display of an image on the display unit 16 and a control function of controlling execution of a function corresponding to the operation part displayed as an image on the display unit 16 and cancellation of execution of the function based on a detection result of the touch detection unit 11B.

The operation control unit 11C includes a following control unit 11D, and the following control unit 11D performs control to display an image on the display unit 16 and control to display the operation part displayed as an image in such a way as to follow a movement operation by the user. That is, when the user performs the movement operation on the operation part while the operation part is displayed on the display unit 16, the following control unit 11D displays the operation part at a position following the movement operation on the display unit 16.

In addition, when the movement operation is completed for the operation part displayed in such a way as to follow the movement operation by the user, the operation control unit 11C controls non-execution of the function or execution of the function according to the position of the operation part. The non-execution of the function is control for maintaining a state (for example, an initial state) in which execution of the function is not started by a movement operation that does not lead to an instruction to execute the function. In addition, the control of the execution of the function includes control for executing a predetermined function or control for stopping execution of a predetermined function. Furthermore, the operation control unit 11C controls processing of issuing an instruction to execute a predetermined function in a case in which a predetermined operation by the user including an operation of selecting the operation part or a movable area of the operation part, which is different from each of the movement operation by the user and the single tapping operation performed by the user on the operation part or the area in which the operation part is movable, is received.

Next, execution of the functions by the CPU 11 of the image forming device 10 according to the present embodiment will be described. The execution of the function by the CPU 11 is exemplified by execution of a document copying function, but the execution of the function is not limited to the execution of the document copying function, and may be another function executed in the image forming device 10.

In the image forming device 10 according to the present embodiment, an instruction portion 30 for issuing an instruction to execute a function is displayed on the display unit 16, and an instruction to execute the function is received.

Figure 3:
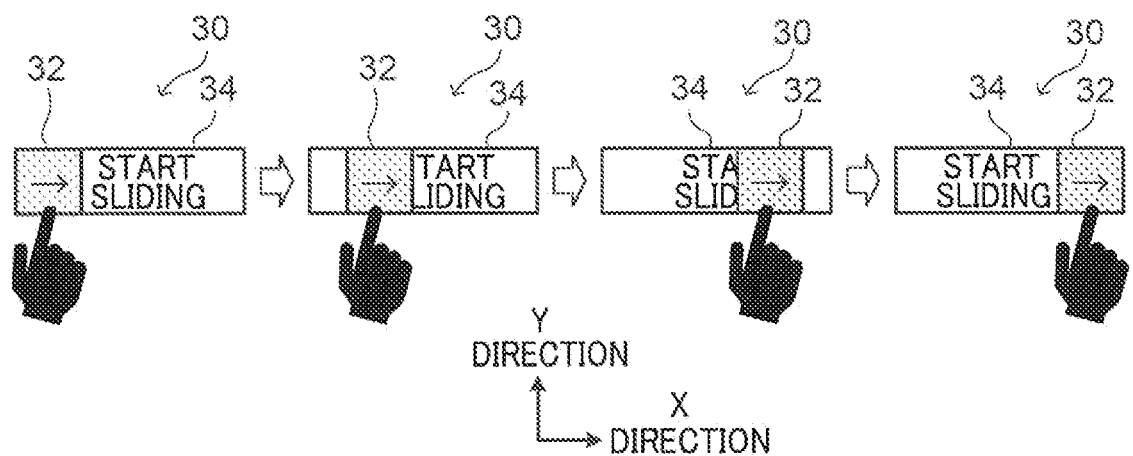
FIG. 3 is a diagram showing an example of an instruction portion displayed on a display unit by processing in a central processing unit (CPU).

FIG. 3 is a diagram showing an example of the instruction portion 30 displayed on the display unit 16 by processing in the CPU 11. In the following description, a horizontally rightward direction of a screen in a state in which the user views the screen is referred to as an X direction, and a vertically upward direction is referred to as a Y direction.

The instruction portion 30 includes a slide mark 32 indicating a movable image for issuing an instruction to execute a function, and a movement area 34 in which the slide mark 32 moves. In the example of FIG. 3, an example is shown in which a "sliding start" message indicating that execution of the operation is started by moving, that is, sliding the slide mark 32 is displayed in the movement area 34. The slide mark 32 corresponds to an example of the operation part.

In the example of FIG. 3, when the slide mark 32 is touched by a finger of the user, the color of the slide mark 32 changes, and the movement operation such as dragging or sliding becomes possible. As shown in FIG. 3, an instruction to execute a function is completed and the function is executed by performing the movement operation such as dragging or sliding the slide mark 32 to an end portion of the movement area 34 in the X direction while touching the slide mark 32 with a finger and then releasing the finger. In the present embodiment, when the finger is released before the slide mark 32 moves to the end portion of the movement area 34, the instruction to execute a function is stopped.

By the way, the movement operation such as dragging or sliding can reduce an erroneous operation as compared with the single tapping operation, but it may be difficult for a user who is not accustomed to the movement operation to perform the operation.

Therefore, in the present embodiment, as described above, the operation control unit 11C executes processing of issuing an instruction to execute a predetermined function in a case in which a predetermined operation by the user including an operation of selecting the slide mark 32 or the movement area 34, which is different from each of the movement operation by the user and the single tapping operation performed by the user on the slide mark 32 or the movement area 34, is received.

Figure 4:
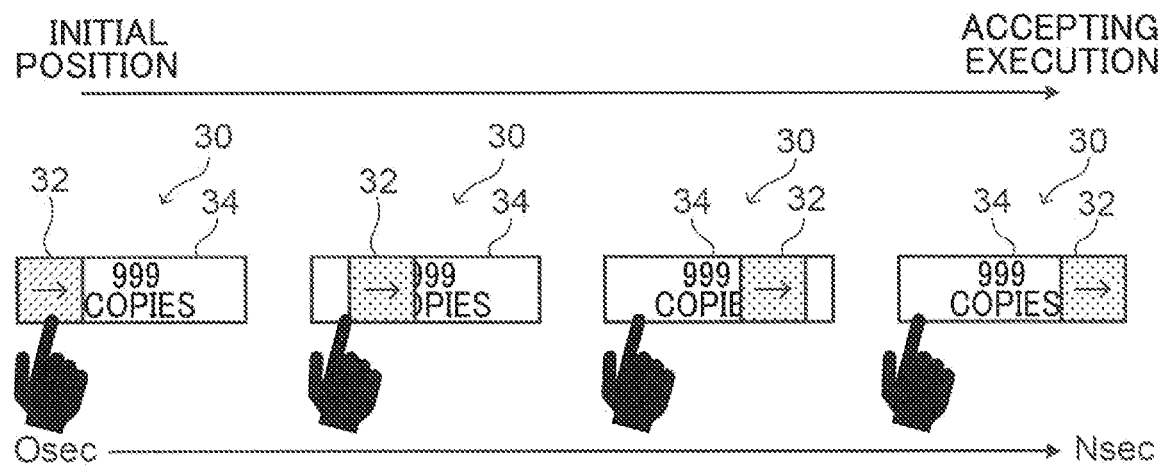
FIG. 4 is a diagram for describing an example of a predetermined operation by a user in the image forming device according to the first embodiment, the predetermined operation being different from each of a movement operation performed by the user and a single tapping operation performed by the user on a slide mark or a movement area, and including an operation of selecting the slide mark or the movement area.

Here, an example of a predetermined operation by the user in the image forming device 10 according to the present embodiment is described, the predetermined operation being different from each of the movement operation performed by the user and the single tapping operation performed by the user on the slide mark 32 or the movement area 34, and including the operation of selecting the slide mark 32 or the movement area 34. FIG. 4 is a diagram for describing an example of a predetermined operation by the user in the image forming device 10 according to the present embodiment, the predetermined operation being different from each of the movement operation performed by the user and the single tapping operation performed by the user on the slide mark 32 or the movement area 34, and including the operation of selecting the slide mark 32 or the movement area 34.

The example of FIG. 4 is an example in which an operation of continuing the touch on the slide mark 32 with the finger for a predetermined time or more is set as the predetermined operation. Specifically, continuing the touch on the slide mark 32 with the finger causes the duration of the touching state to be measured, and the slide mark 32 is displayed in such a way as to move along the movement area 34 as time elapses. When the duration of the touching state in which the finger touches the slide mark 32 reaches a predetermined time, and the slide mark 32 reaches the end portion of the movement area 34, an instruction to execute the function is issued when the finger is released. Further, when the finger is released from the display unit 16 before the slide mark 32 moves to the end portion of the movement area, the instruction to execute a function is stopped. As described above, in the present embodiment, by continuing the touch operation on the initial position of the slide mark 32, an alternative operation for the sliding operation is performed. In the present embodiment, the operation of continuing the touch on the slide mark 32 with the finger for a predetermined time or more is set as the predetermined operation, but the present disclosure is not limited thereto. For example, an operation of continuing the touch on the movement area 34 with the finger for a predetermined time or more may be set as the predetermined operation. Alternatively, an operation of continuing the touch on a predetermined position other than the slide mark 32 and the movement area 34 with the finger for a predetermined time or more may be set as the predetermined operation.

Figure 5:
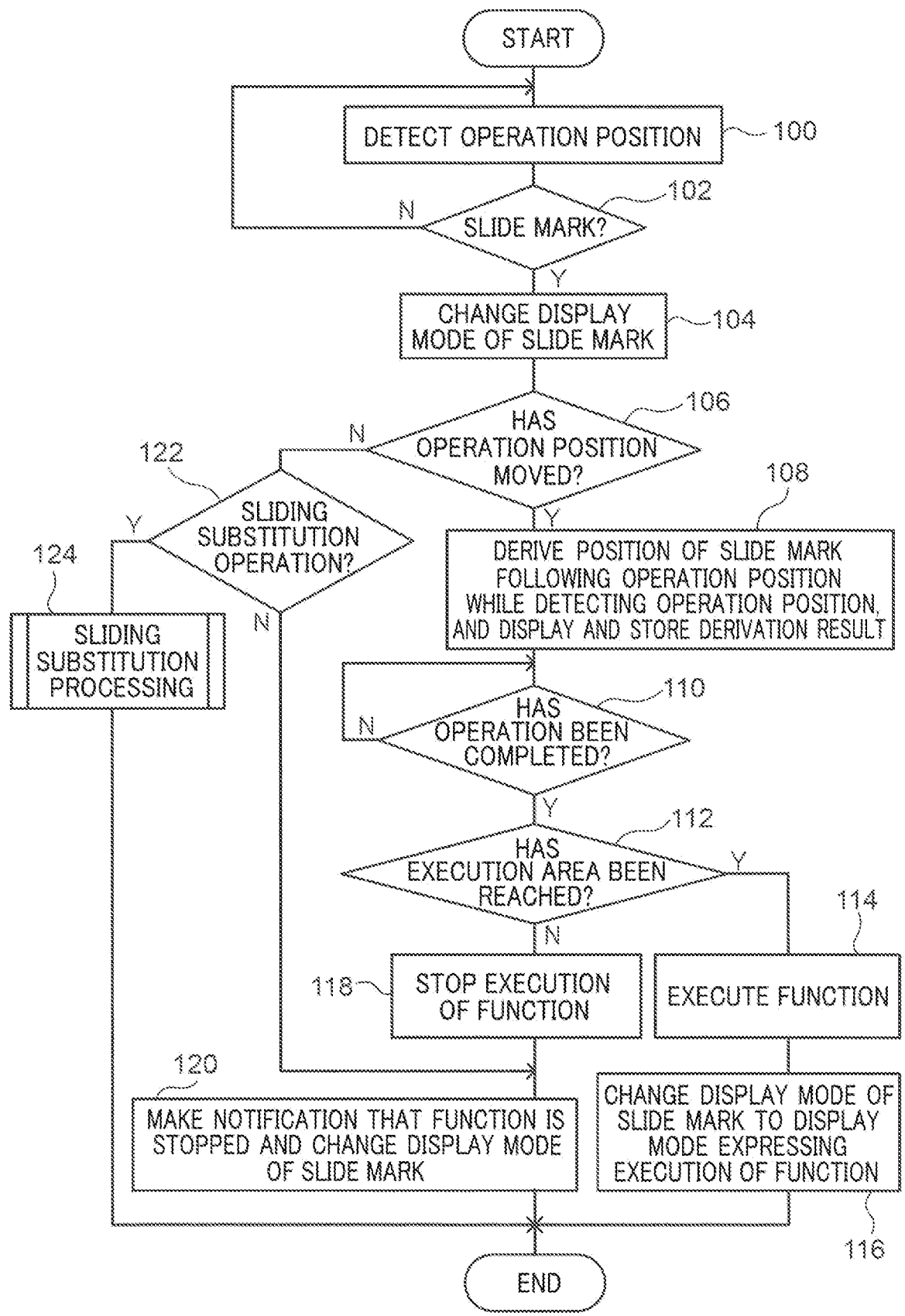
FIG. 5 is a flowchart showing an example of a flow of processing executed by the image forming device according to the first embodiment.

Next, the operation of the image forming device 10 according to the present embodiment configured as described above will be described. FIG. 5 is a flowchart showing an example of a flow of processing executed by the image forming device 10 according to the present embodiment. In the processing of FIG. 5, the information processing program 15A is started when the image forming device 10 is instructed to display a predetermined screen such as an image for executing the document copying function as an example.

In step 100, the CPU 11 detects an operation position touched by the finger of the user on the predetermined screen, and the processing proceeds to step 102.

In step 102, the CPU 11 determines whether or not the operation position detected in step 100 is the slide mark 32. In a case in which the determination is affirmative, the processing proceeds to step 104, and in a case in which the determination is negative, the processing returns to step 100 and the processing is repeated.

In step 104, the CPU 11 changes the display mode of the slide mark 32, and the processing proceeds to step 106. For example, as the color changes, the display mode is changed to a display mode representing a function execution reservation.

In step 106, the CPU 11 determines whether or not the operation position has moved. In the determination, it is determined whether or not the movement operation such as dragging or sliding has been performed. In a case in which the determination is affirmative, the processing proceeds to step 108, and in a case in which the determination is negative, the processing proceeds to step 122.

In step 108, the CPU 11 derives the position of the slide mark 32 following the operation position while detecting the operation position touched by the finger of the user, and displays and stores the derivation result, and the processing proceeds to step 110.

In step 110, the CPU 11 determines whether or not the movement operation by the user has been completed. The completion of the movement operation is determined when the finger of the user is released from the slide mark 32 (a following relationship between the finger of the user and the slide mark 32 is released). The processing waits until the affirmative determination is made, and then proceeds to step 112.

In step 112, the CPU 11 determines whether or not the position of the slide mark 32 when the movement operation by the user has been completed in step 110 has reached the end portion of the movement area 34. In a case in which the determination is affirmative, the processing proceeds to step 114, and in a case in which the determination is negative, the processing proceeds to step 118.

In step 114, the CPU 11 executes the function, and the processing proceeds to step 116. For example, in the case of the copying function, the copying function is executed.

In step 116, the CPU 11 changes the display mode (for example, the color) of the slide mark 32 to a display mode expressing execution of the function, and ends a series of processing by the information processing program 15A.

In addition, in step 118, the CPU 11 stops execution of the predetermined function, and the processing proceeds to step 120.

In step 120, for example, the CPU 11 changes the display mode (for example, the color) of the slide mark 32 in order to make a notification that the execution of the function has been stopped, and ends the series of processing by the information processing program 15A.

On the other hand, in step 122, the CPU 11 determines whether or not a sliding substitution operation has been performed. In the present embodiment, in the determination, for example, it is determined whether or not the duration of the touching state in which the finger touches the slide mark 32 is equal to or longer than a predetermined time. In a case in which the determination is affirmative, the processing proceeds to step 124, and in a case in which the determination is negative, the processing proceeds to step 120 described above.

In step 124, the CPU 11 performs the sliding substitution processing and ends a series of processing by the information processing program 15A.

Figure 6:
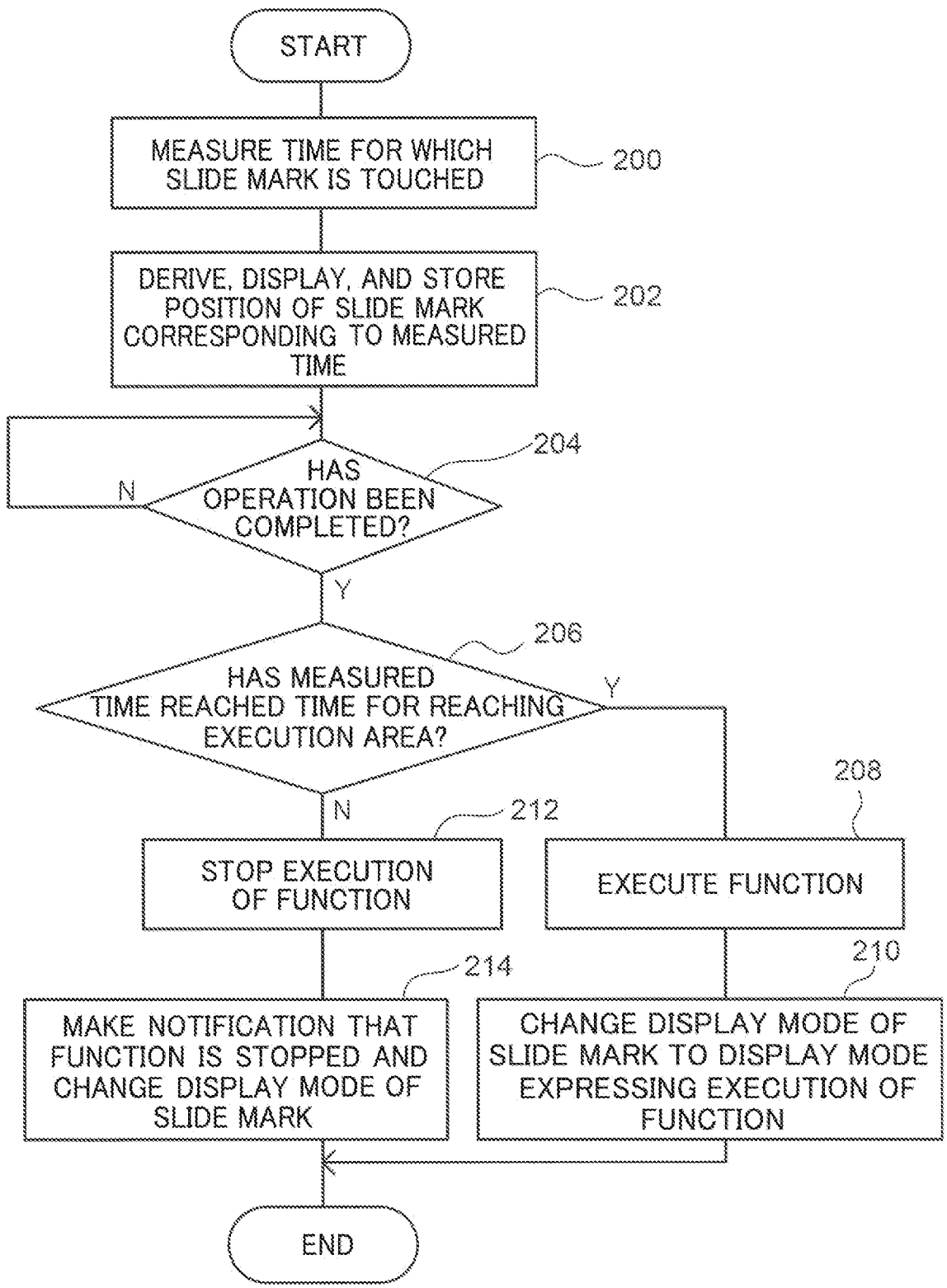
FIG. 6 is a flowchart showing a flow of an example of sliding substitution processing in the image forming device according to the first embodiment.

Here, the sliding substitution processing in the present embodiment will be described in detail. FIG. 6 is a flowchart showing a flow of an example of the sliding substitution processing in the image forming device 10 according to the present embodiment.

In step 200, the CPU 11 measures a time for which the slide mark 32 is touched, and the processing proceeds to step 202.

In step 202, the CPU 11 derives the position of the slide mark 32 corresponding to the measured time, and displays and stores the position, and the processing proceeds to step 204. For example, the position of the slide mark 32 for each time for which the slide mark 32 is touched is determined in advance, and the position corresponding to the measured time is derived, displayed, and stored.

In step 204, the CPU 11 determines whether or not the operation has been completed. In the determination, it is determined whether or not the finger of the user has been released. The processing waits until the affirmative determination is made, and then proceeds to step 206.

In step 206, the CPU 11 determines whether or not the measured time has reached a time for reaching an execution area. In the determination, it is determined whether or not a time from the touch of the slide mark 32 to the release of the finger of the user is equal to or longer than a predetermined time for reaching the end portion of the movement area 34. In a case in which the determination is affirmative, the processing proceeds to step 208, and in a case in which the determination is negative, the processing proceeds to step 212.

In step 208, the CPU 11 executes the function, and the processing proceeds to step 210. For example, in the case of the copying function, the copying function is executed.

In step 210, the CPU 11 changes the display mode (for example, the color) of the slide mark 32 to a display mode expression execution of the function, and ends the sliding substitution processing.

On the other hand, in step 212, the CPU 11 stops execution of the predetermined function, and the processing proceeds to step 214.

In step 214, for example, the CPU 11 changes the display mode (for example, the color) of the slide mark 32 in order to make a notification that the execution of the function has been stopped, and ends the sliding substitution processing.

As described above, in the present embodiment, an instruction to execute the operation is received by the operation by the sliding operation or the operation by the sliding substitution processing, and the function such as the copying function is executed.

Second Embodiment

Next, an image forming device 10 according to a second embodiment will be described. The basic configuration of the present embodiment is the same as that of the first embodiment. The present embodiment is different from the first embodiment in a predetermined operation by a user, the predetermined operation being different from each of a movement operation performed by the user and a single tapping operation performed by the user on a slide mark 32 or a movement area 34, and including an operation of selecting the slide mark 32 or the movement area 34. Hereinafter, only differences from the first embodiment will be described.

Figure 7:
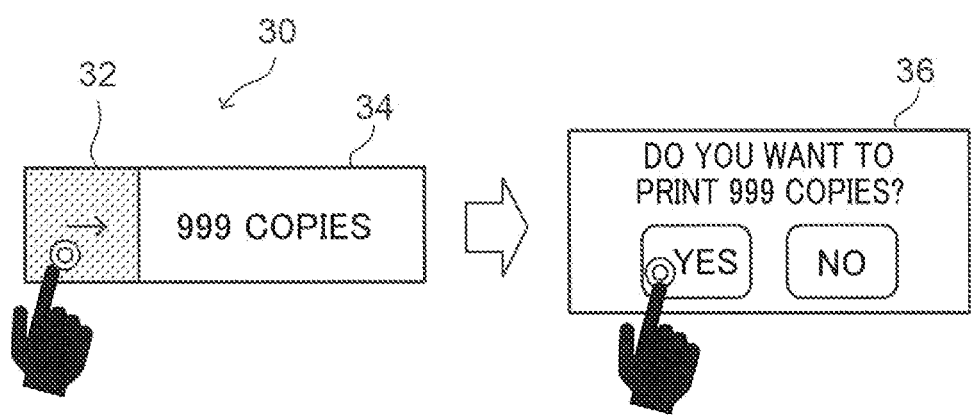
FIG. 7 is a diagram for describing an example of a predetermined operation performed by a user in an image forming device according to a second embodiment, the predetermined operation being different from each of a movement operation performed by the user and a single tapping operation performed by the user on a slide mark or a movement area, and including an operation of selecting the slide mark or the movement area.

FIG. 7 is a diagram for describing an example of the predetermined operation by the user in the image forming device 10 according to the present embodiment, the predetermined operation being different from each of the movement operation performed by the user and the single tapping operation performed by the user on the slide mark 32 or the movement area 34, and including the operation of selecting the slide mark 32 or the movement area 34.

In the present embodiment, in addition to the sliding operation of sliding the slide mark 32, a confirmation screen is displayed, and an instruction to execute the function is issued when the execution is selected on the confirmation screen. Specifically, as shown in FIG. 7, when the slide mark 32 is tapped, the confirmation screen 36 is displayed, and an instruction to execute the function is issued by further tapping "Yes" on the confirmation screen 36. In the present embodiment, an example in which the confirmation screen 36 is displayed by tapping the slide mark 32 is described, but the display of the confirmation screen 36 is not limited thereto, and for example, the confirmation screen 36 may be displayed by tapping the movement area 34. Alternatively, a confirmation screen display button or the like may be provided to display the confirmation screen 36.

Next, the operation of the image forming device 10 according to the present embodiment will be described. In the present embodiment, since sliding substitution processing is different from that of the first embodiment, the sliding substitution processing will be described.

Figure 8:
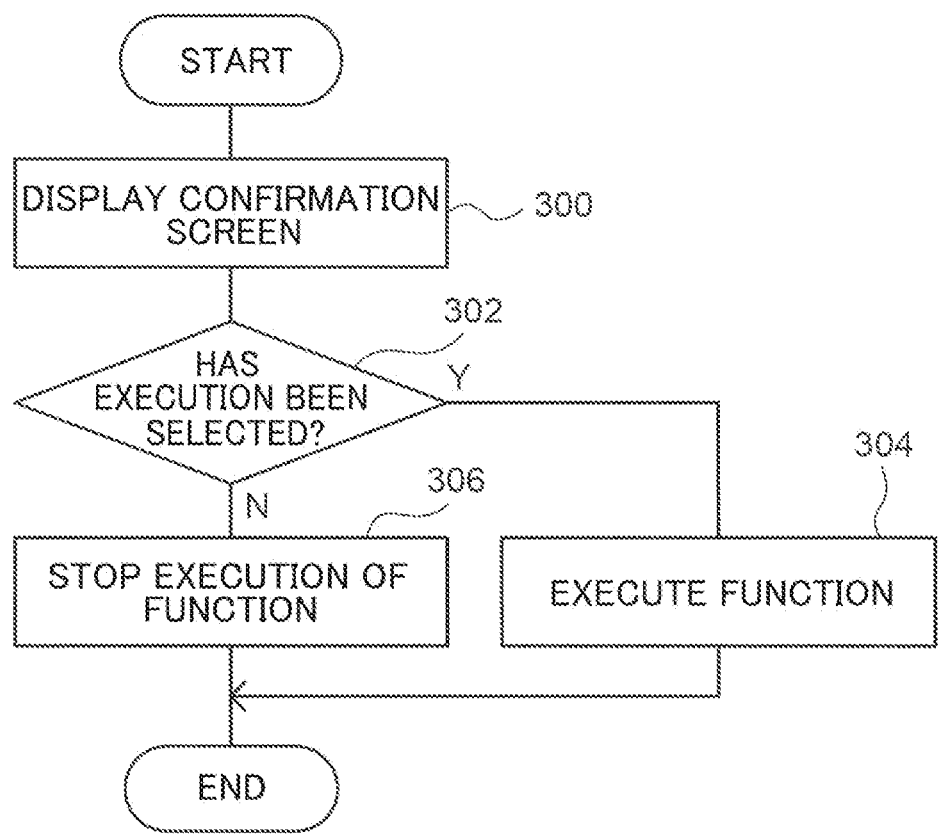
FIG. 8 is a flowchart showing a flow of an example of sliding substitution processing in the image forming device according to the second embodiment.

FIG. 8 is a flowchart showing a flow of an example of the sliding substitution processing in the image forming device 10 according to the present embodiment. In the present embodiment, it is determined in step 122 described above whether or not the slide mark 32 has been tapped as determination of whether or not the sliding substitution operation has been performed, and in a case in which the slide mark 32 has been tapped, the processing of FIG. 8 starts.

In step 300, the CPU 11 displays the confirmation screen 36, and the processing proceeds to step 302. That is, the confirmation screen 36 is displayed as shown in FIG. 7.

In step 302, the CPU 11 determines whether or not execution has been selected. In the case of the confirmation screen 36 in FIG. 7, it is determined in the determination whether or not "Yes" has been selected. In a case in which the determination is affirmative, the processing proceeds to step 304, and in a case in which the determination is negative, the processing proceeds to step 306.

In step 304, the CPU 11 executes the function and ends the sliding substitution processing.

On the other hand, in step 306, the CPU 11 stops execution of the predetermined function and ends the sliding substitution processing.

Third Embodiment

Next, an image forming device 10 according to a third embodiment will be described. The basic configuration of the present embodiment is also the same as that of the first embodiment. The present embodiment is also different from the first embodiment in a predetermined operation by a user, the predetermined operation being different from each of a movement operation performed by the user and a single tapping operation performed by the user on a slide mark 32 or a movement area 34, and including an operation of selecting the slide mark 32 or the movement area 34. Hereinafter, only differences from the first embodiment will be described.

Figure 9:
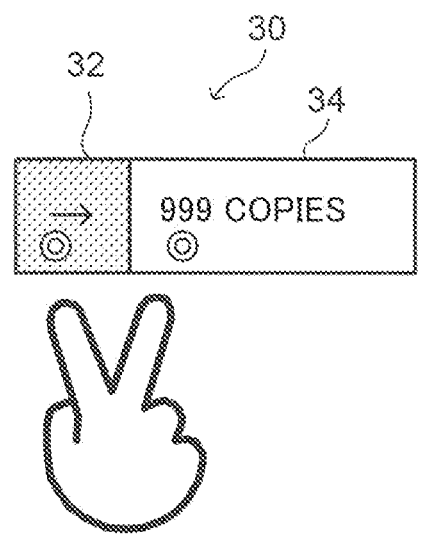
FIG. 9 is a diagram for describing an example of a predetermined operation by a user in an image forming device according to a third embodiment, the predetermined operation being different from each of a movement operation performed by the user and a single tapping operation performed by the user on a slide mark or a movement area, and including an operation of selecting the slide mark or the movement area.

FIG. 9 is a diagram for describing an example of the predetermined operation by the user in the image forming device 10 according to the present embodiment, the predetermined operation being different from each of the movement operation performed by the user and the single tapping operation performed by the user on the slide mark 32 or the movement area 34, and including the operation of selecting the slide mark 32 or the movement area 34.

In the present embodiment, an instruction to execute a function is issued by an operation of tapping two points separated by a predetermined distance in addition to the sliding operation of sliding the slide mark 32. Specifically, as shown in FIG. 9, an instruction to execute the function is issued by tapping two points including the slide mark 32 and the movement area 34 that is separated from the slide mark 32 by a certain distance. In the present embodiment, the operation of tapping the two points including the slide mark 32 and the movement area 34 is set as the predetermined operation, but the positions of the two tapped points are not limited thereto. For example, the slide mark 32 and a portion other than the movement area 34, or the movement area 34 and a portion other than the slide mark 32 may be tapped. Alternatively, an operation of tapping two points two times may be set as the predetermined operation. Alternatively, an operation of tapping three or more point once or two times may be set as the predetermined operation.

Next, the operation of the image forming device 10 according to the present embodiment will be described. In the present embodiment, since sliding substitution processing is different from that of the first embodiment, the sliding substitution processing will be described.

Figure 10:
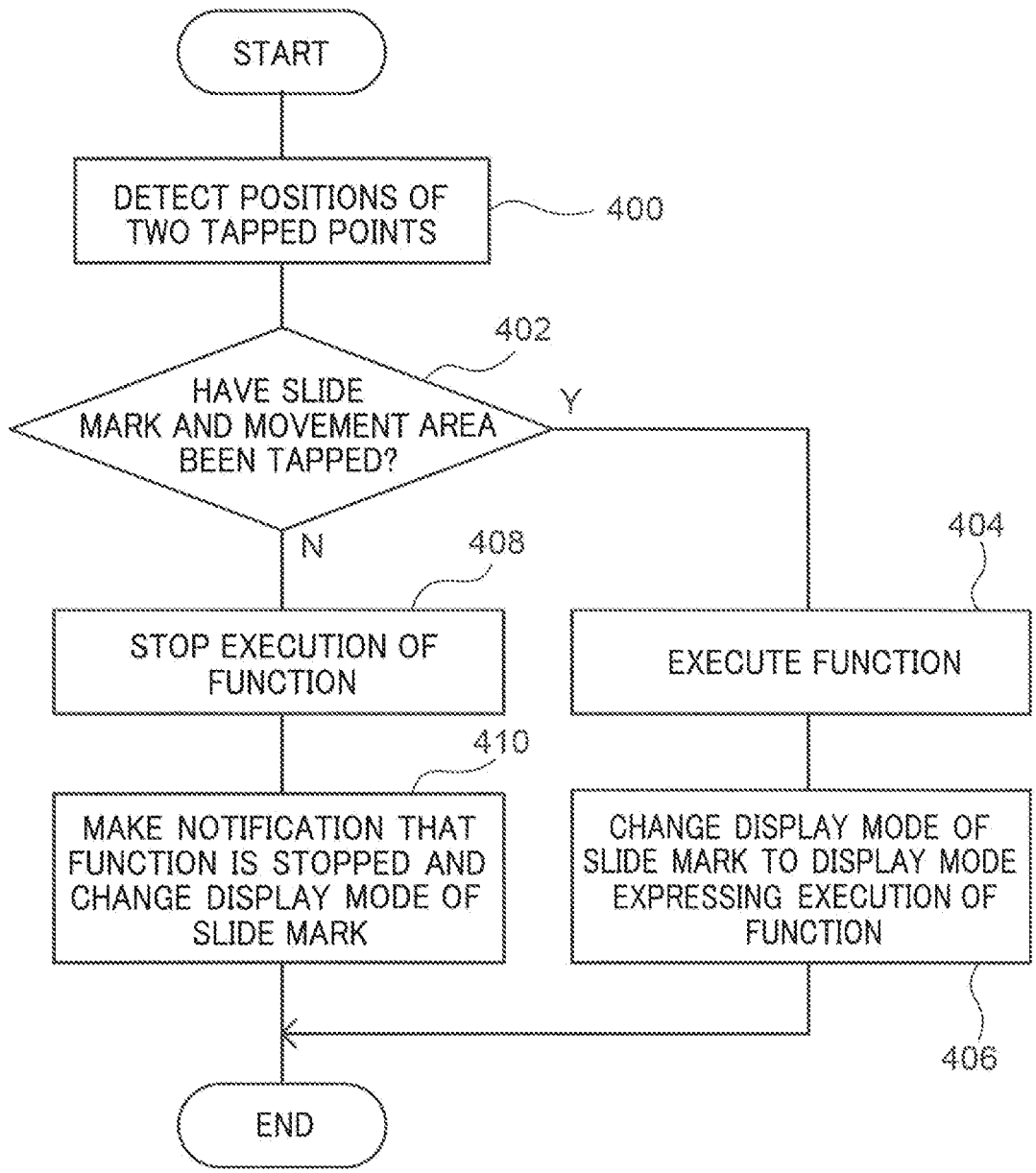
FIG. 10 is a flowchart showing a flow of an example of sliding substitution processing in the image forming device according to the third embodiment.

FIG. 10 is a flowchart showing a flow of an example of the sliding substitution processing in the image forming device 10 according to the present embodiment. In the present embodiment, it is determined in step 122 described above whether or not two point have been tapped as determination of whether or not the sliding substitution operation has been performed, and in a case in which two points have been tapped, the processing of FIG. 10 starts.

In step 400, the CPU 11 detects positions of two tapped points, and the processing proceeds to step 402.

In step 402, the CPU 11 determines whether or not the positions of the two tapped points are the slide mark 32 and the movement area 34. In a case in which the determination is affirmative, the processing proceeds to step 404, and in a case in which the determination is negative, the processing proceeds to step 408. In the present embodiment, in a case in which the positions of the two tapped points are the slide mark 32 and the movement area 34, it is determined as the predetermined operation, but the two tapped points are not limited thereto, and the other two points may be applied.

In step 404, the CPU 11 executes the function, and the processing proceeds to step 406. For example, in the case of the copying function, the copying function is executed.

In step 406, the CPU 11 changes the display mode (for example, the color) of the slide mark 32 to a display mode expression execution of the function, and ends the sliding substitution processing.

On the other hand, in step 408, the CPU 11 stops execution of the predetermined function, and the processing proceeds to step 410.

In step 410, for example, the CPU 11 changes the display mode (for example, the color) of the slide mark 32 in order to make a notification that the execution of the function has been stopped, and ends the sliding substitution processing.

Figure 11:
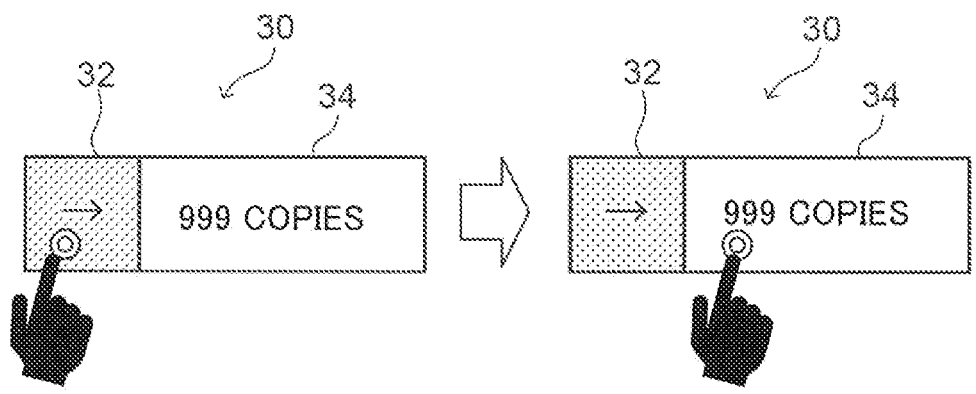
FIG. 11 is a diagram for describing a predetermined operation according to a modified example of the third embodiment.

In the present embodiment, an operation of simultaneously tapping two points including the slide mark 32 and the movement area 34 separated from the slide mark 32 by a certain distance is set as the predetermined operation, and an instruction to execute the function is issued. However, tapping a plurality of points does not have to be performed simultaneously. For example, as shown in FIG. 11, an operation of tapping the movement area 34 after tapping the slide mark 32 may be set as the predetermined operation. The operation of sequentially tapping two points is not limited to a two-point tapping operation of tapping the slide mark 32 and then tapping the movement area 34. For example, the operation of sequentially tapping two points may also be a two-point tapping operation of tapping the movement area 34 and then tapping the slide mark 32. Alternatively, the operation of sequentially tapping two points may be a two-point tapping operation of tapping the slide mark 32 and then tapping a portion other than the movement area 34. Alternatively, the operation of sequentially tapping two points may be a two-point tapping operation of tapping the movement area 34 and then tapping a portion other than the slide mark 32.

Figure 12:
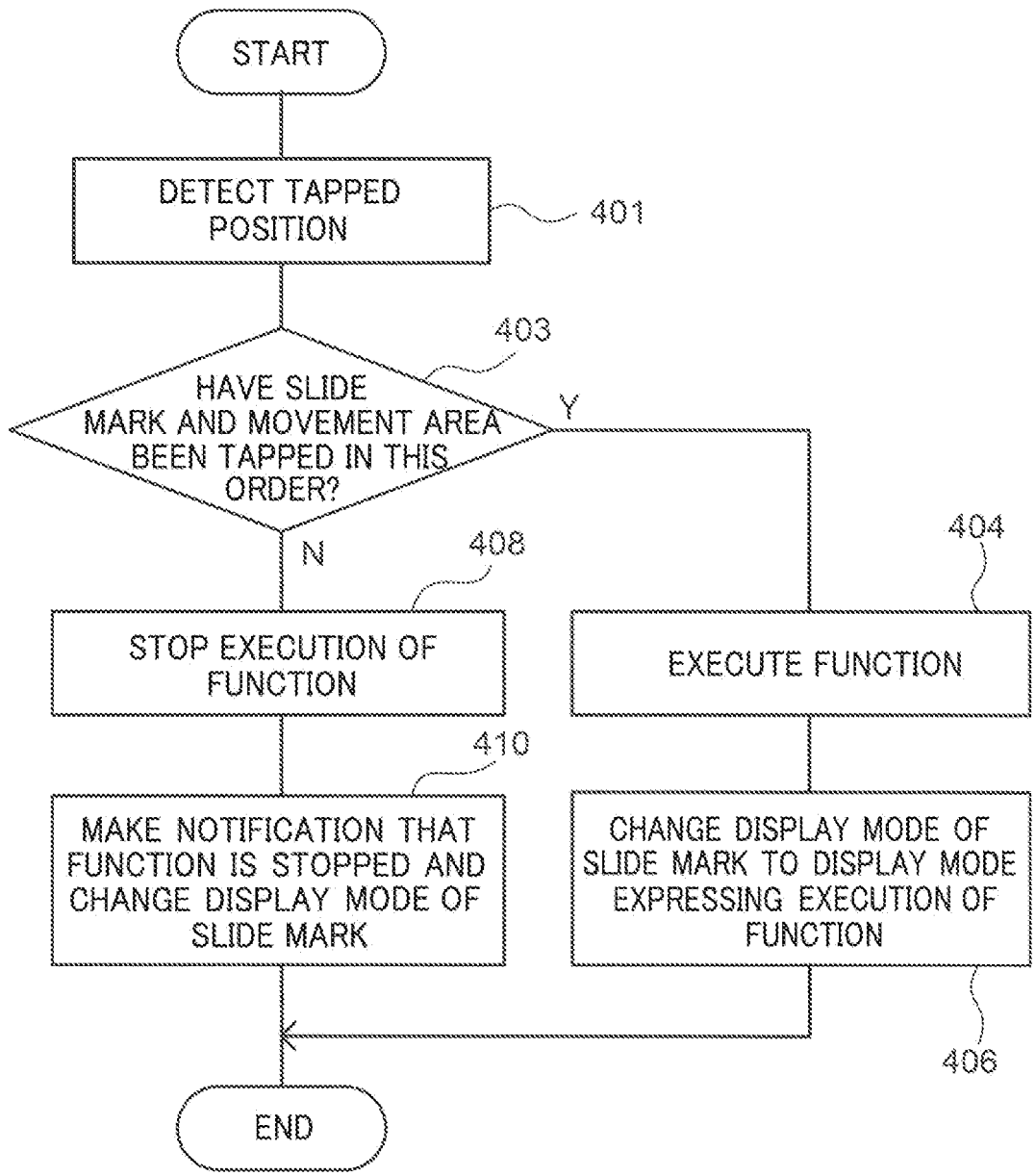
FIG. 12 is a flowchart showing a flow of an example of sliding substitution processing according to the modified example of the third embodiment.

In the sliding substitution processing in a case in which the two-point tapping operation of tapping the slide mark 32 and then tapping the movement area 34 is set as the predetermined operation, the processing of steps 401 and 403 is performed instead of steps 400 and 402 as shown in FIG. 12. FIG. 12 is a flowchart showing a flow of an example of sliding substitution processing according to a modified example of the present embodiment. In the modified example, it is determined in step 122 described above whether or not the slide mark 32 has been tapped as determination of whether or not the sliding substitution operation has been performed, and in a case in which the slide mark 32 has been tapped, the processing of FIG. 12 starts. A detailed description of the same processing as that in FIG. 10 will be omitted.

In step 401, the CPU 11 detects a tapped position, and the processing proceeds to step 403. That is, the tapped position tapped next to the slide mark 32 is detected. Specifically, the tap position tapped within a predetermined time after the slide mark 32 is tapped is detected.

In step 403, the CPU 11 determines whether or not the slide mark 32 and the movement area 34 have been tapped in this order. In a case in which the determination is affirmative, the processing proceeds to step 404 described above, and in a case in which the determination is negative, the processing proceeds to step 408 described above.

Fourth Embodiment

Next, an image forming device 10 according to a fourth embodiment will be described. The basic configuration of the present embodiment is also the same as that of the first embodiment. The present embodiment is also different from the first embodiment in a predetermined operation by a user, the predetermined operation being different from each of a movement operation performed by the user and a single tapping operation performed by the user on a slide mark 32 or a movement area 34, and including an operation of selecting the slide mark 32 or the movement area 34. Hereinafter, only differences from the first embodiment will be described.

Figure 13:
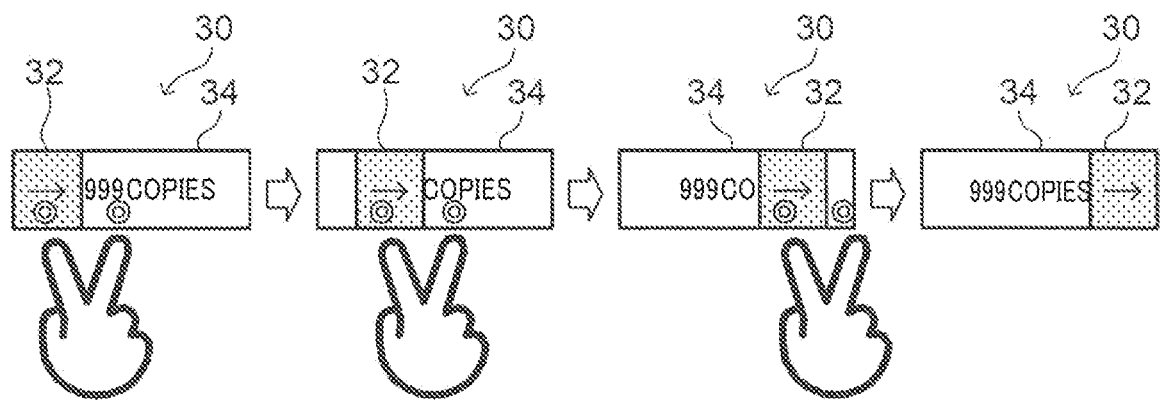
FIG. 13 is a diagram for describing an example of a predetermined operation by a user in an image forming device according to a fourth embodiment, the predetermined operation being different from each of a movement operation performed by the user and a single tapping operation performed by the user on a slide mark or a movement area, and including an operation of selecting the slide mark or the movement area.

FIG. 13 is a diagram for describing an example of the predetermined operation by the user in the image forming device 10 according to the present embodiment, the predetermined operation being different from each of the movement operation performed by the user and the single tapping operation performed by the user on the slide mark 32 or the movement area 34, and including the operation of selecting the slide mark 32 or the movement area 34.

Similarly to the third embodiment, in the present embodiment, an operation of tapping two points separated by a predetermined distance is performed in addition to the sliding operation of sliding the slide mark 32. However, in the present embodiment, an instruction to execute a function is not issued by tapping two points once, but is issued by tapping two point a plurality of times. Specifically, as shown in FIG. 13, two points including the slide mark 32 and the movement area 34 separated from the slide mark 32 by a certain distance are tapped, a distance between the two points is calculated, the slide mark 32 is moved according to the calculated distance, and an instruction to execute the function is issued in a case in which a movement amount exceeds a predetermined threshold. The positions of the two tapped points are not limited to the slide mark 32 and the movement area 34, and may be other two points.

Next, the operation of the image forming device 10 according to the present embodiment will be described. In the present embodiment, since sliding substitution processing is different from that of the first embodiment, the sliding substitution processing will be described.

Figure 14:
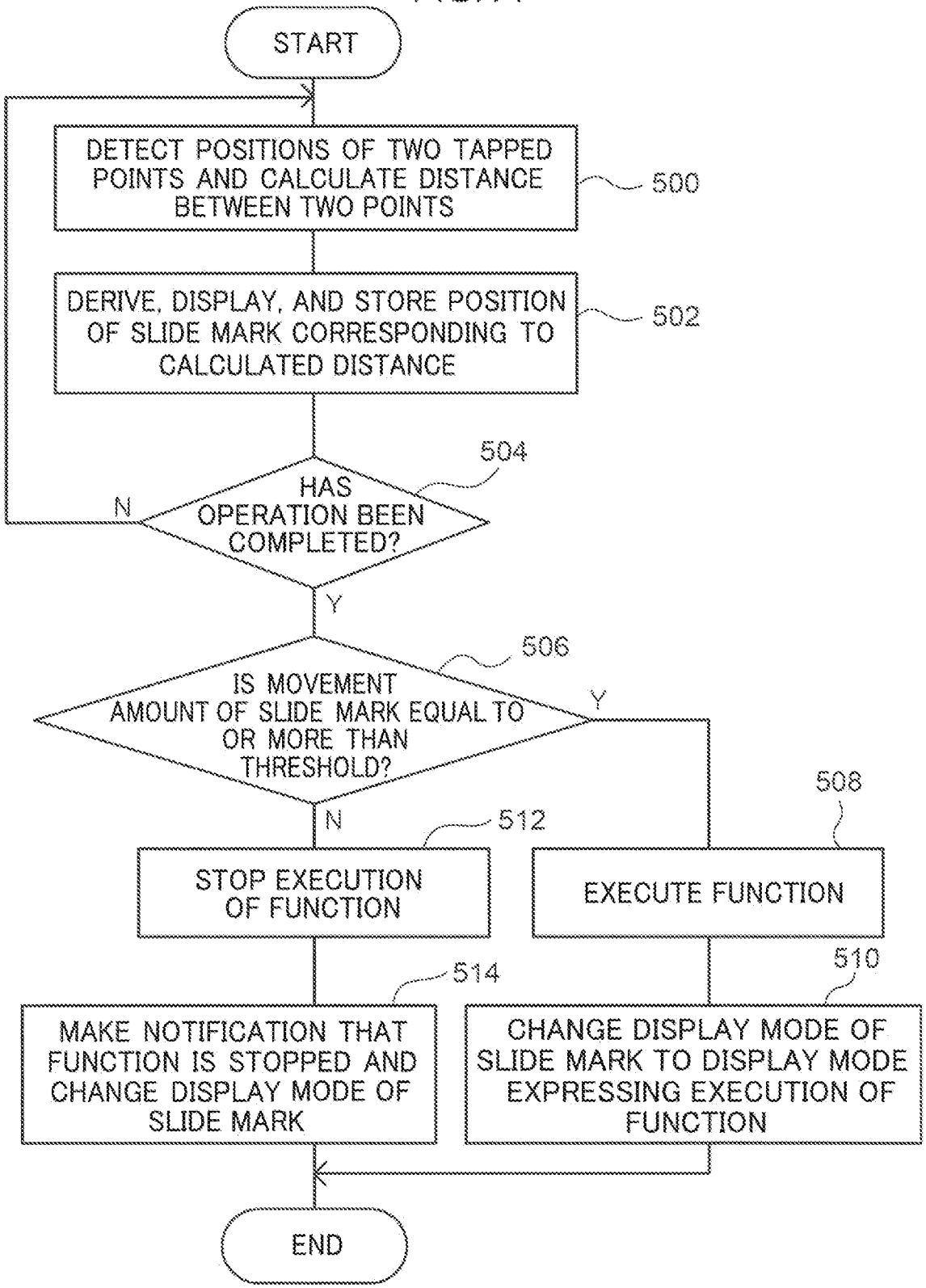
FIG. 14 is a flowchart showing a flow of an example of sliding substitution processing in the image forming device according to the fourth embodiment.

FIG. 14 is a flowchart showing a flow of an example of the sliding substitution processing in the image forming device 10 according to the present embodiment. In the present embodiment, it is determined in step 122 described above whether or not two points including the slide mark 32 and the movement area 34 have been tapped as determination of whether or not the sliding substitution operation has been performed, and in a case in which two points have been tapped, the processing of FIG. 14 starts.

In step 500, the CPU 11 detects positions of two tapped points and calculates a distance between the two points, and the processing proceeds to step 502.

In step 502, the CPU 11 derives, displays, and stores the position of the slide mark 32 according to the distance calculated in step 500, and the processing proceeds to step 504.

In step 504, the CPU 11 determines whether or not the operation has been completed. In the determination, it is determined whether or not tapping is no longer detected or whether or not points other than two points including the slide mark 32 and the movement area 34 have been tapped. The processing waits until the affirmative determination is made, and then proceeds to step 506.

In step 506, the CPU 11 determines whether or not the movement amount of the slide mark 32 is equal to or more than a threshold. In the determination, for example, it is determined whether or not the movement amount of the slide mark 32 according to the number of times tapping is performed has reached a movement amount for reaching an end portion of the movement area 34. In a case in which the determination is affirmative, the processing proceeds to step 508, and in a case in which the determination is negative, the processing proceeds to step 512.

In step 508, the CPU 11 executes the function, and the processing proceeds to step 510. For example, in the case of the copying function, the copying function is executed.

In step 510, the CPU 11 changes the display mode (for example, the color) of the slide mark 32 to a display mode expression execution of the function, and ends the sliding substitution processing.

On the other hand, in step 512, the CPU 11 stops execution of the predetermined function, and the processing proceeds to step 514.

In step 514, for example, the CPU 11 changes the display mode (for example, the color) of the slide mark 32 in order to make a notification that the execution of the function has been stopped, and ends the sliding substitution processing.

Fifth Embodiment

Next, an image forming device 10 according to a fifth embodiment will be described. The basic configuration of the present embodiment is also the same as that of the first embodiment. The present embodiment is also different from the first embodiment in a predetermined operation by a user, the predetermined operation being different from each of a movement operation performed by the user and a single tapping operation performed by the user on a slide mark 32 or a movement area 34, and including an operation of selecting the slide mark 32 or the movement area 34. Hereinafter, only differences from the first embodiment will be described.

Figure 15:
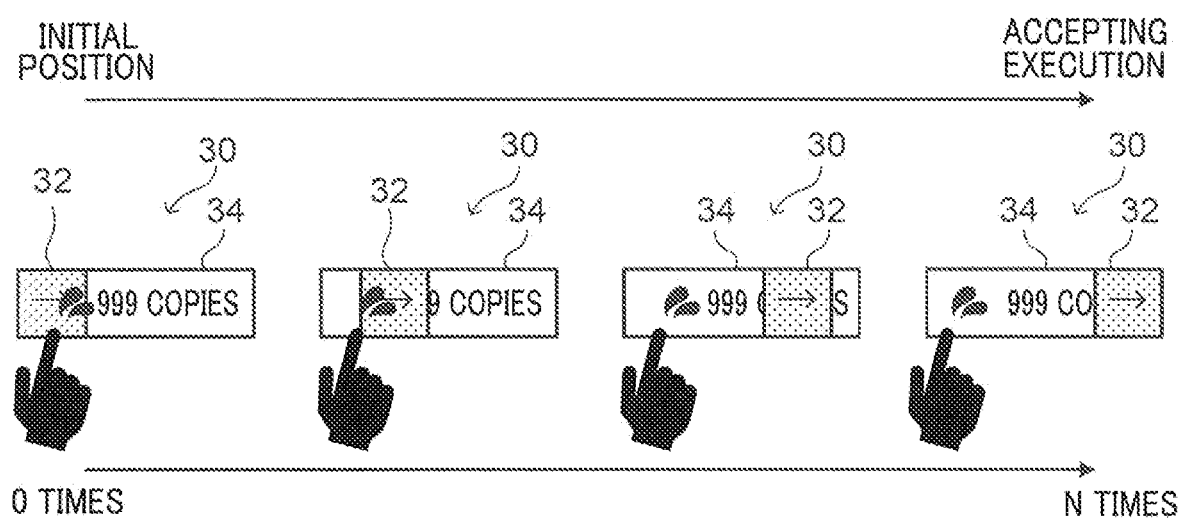
FIG. 15 is a diagram for describing an example of a predetermined operation by a user in an image forming device according to a fifth embodiment, the predetermined operation being different from each of a movement operation performed by the user and a single tapping operation performed by the user on a slide mark or a movement area, and including an operation of selecting the slide mark or the movement area.

FIG. 15 is a diagram for describing an example of the predetermined operation by the user in the image forming device 10 according to the present embodiment, the predetermined operation being different from each of the movement operation performed by the user and the single tapping operation performed by the user on the slide mark 32 or the movement area 34, and including the operation of selecting the slide mark 32 or the movement area 34.

In the present embodiment, an instruction to execute a function is issued by performing an operation of performing tapping a predetermined number of times corresponding to a movement amount of the slide mark 32 to an end portion of the movement area 34, in addition to the sliding operation of sliding the slide mark 32. Specifically, as shown in FIG. 15, the slide mark 32 is tapped a plurality of times. Then, the number of times the tapping is performed within a certain predetermined time is counted, the slide mark 32 is moved according to the counted number of times, and an instruction to execute the function is issued in a case in which the movement amount exceeds a predetermined threshold. A portion to be tapped a plurality of times is not limited to the position of the slide mark 32. For example, the movement area 34 may be tapped, or other portions may be tapped.

Next, the operation of the image forming device 10 according to the present embodiment will be described. In the present embodiment, since sliding substitution processing is different from that of the first embodiment, the sliding substitution processing will be described.

FIG. 16 is a flowchart showing a flow of an example of the sliding substitution processing in the image forming device 10 according to the present embodiment. In the present embodiment, it is determined in step 122 described above whether or not the slide mark 32 has been tapped as determination of whether or not the sliding substitution operation has been performed, and in a case in which the slide mark 32 has been tapped, the processing of FIG. 16 starts.

In step 600, the CPU 11 counts the number of times the slide mark 32 is tapped, and the processing proceeds to step 602.

In step 602, the CPU 11 derives the position of the slide mark 32 according to the number of times the slide mark 32 is tapped within a predetermined time, and displays and stores the position, and the processing proceeds to step 604.

In step 604, the CPU 11 determines whether or not the operation has been completed. In the determination, it is determined whether or not the tapping is no longer detected. The processing waits until the affirmative determination is made, and then proceeds to step 606.

In step 606, the CPU 11 determines whether or not the movement amount of the slide mark 32 is equal to or more than a threshold. In the determination, for example, it is determined whether or not the movement amount of the slide mark 32 according to the number of times tapping is performed has reached a movement amount for reaching an end portion of the movement area 34. In a case in which the determination is affirmative, the processing proceeds to step 608, and in a case in which the determination is negative, the processing proceeds to step 612.

In step 608, the CPU 11 executes the function, and the processing proceeds to step 610. For example, in the case of the copying function, the copying function is executed.

In step 610, the CPU 11 changes the display mode (for example, the color) of the slide mark 32 to a display mode expression execution of the function, and ends the sliding substitution processing.

On the other hand, in step 612, the CPU 11 stops execution of the predetermined function, and the processing proceeds to step 614.

In step 614, for example, the CPU 11 changes the display mode (for example, the color) of the slide mark 32 in order to make a notification that the execution of the function has been stopped, and ends the sliding substitution processing.

In the above embodiments, an operation to be received may be switched according to the degree of importance, risk, or the like of the function for which the execution instruction is to be issued. For example, in the image forming device 10, for a function for which erroneous transmission is extremely critical, such as facsimile transmission or electronic mail, an instruction to execute the function may be received by the sliding operation or an alternative operation for the sliding operation according to each embodiment described above, and execution of the function may be accepted by a normal tap start button for other functions.

Furthermore, in the embodiment described above, the CPU has been described as an example of the processor. However, the processor refers to a processor in a broad sense, and includes a general-purpose processor (for example, a central processing unit (CPU)) or a dedicated processor (for example, a graphics processing unit (GPU), an application specific integrated circuit (ASIC), a field programmable gate array (FPGA), or a programmable logic device).

In addition, the operation of the processor in the embodiment described above may be performed not only by one processor but also by a plurality of processors existing at physically separated positions in cooperation. In addition, the order of the respective operations of the processor is not limited to the order described in each embodiment described above, and may be changed, if appropriate.

In addition, the processing executed by the image forming device 10 according to the embodiment described above may be processing executed by software, processing executed by hardware, or executed by a combination of software and hardware. Furthermore, the processing executed by each unit of the image forming device 10 may be stored in a storage medium as a program and distributed.

In addition, the technology of the disclosure is not limited to the above, and it is a matter of course that various modifications can be made in addition to the above without departing from the gist of the disclosure.

The disclosure of Japanese Patent Application No. 2021-023754 is incorporated herein by reference in its entirety. All documents, patent applications, and technical standards mentioned herein are incorporated herein by reference to the same extent as if each individual document, patent application, and technical standard were specifically and individually stated.

The invention claimed is:

1. An information processing device comprising:
a processor, wherein the processor executes processing comprising: displaying, on a display unit, an operation part that receives an operation by a user; displaying, in a case in which a movement operation of moving the operation part in a selected state is received, the operation part in such a way as to move while following the movement operation, and issuing an instruction to execute a predetermined function by moving the operation part to a predetermined position by the movement operation and then completing the movement operation; and issuing an instruction to execute the predetermined function in a case in which a predetermined operation that is different from each of the movement operation and a single tapping operation performed by the user on the operation part or an area in which the operation part is movable, and that includes an operation of selecting at least one of the operation part or the area in which the operation part is movable, is received, wherein the predetermined operation is an operation of tapping a plurality of positions, wherein one of the plurality of positions is the operation part, and another position is a movement area in which the operation part moves.

2. The information processing device according to claim 1, wherein the predetermined operation is an operation of continuing a touching state in which a finger touches the operation part or the area in which the operation part is movable for a predetermined time or more.

3. The information processing device according to claim 2, wherein the predetermined operation is an operation performed on the operation part.

4. The information processing device according to claim 3, wherein the processor executes processing of displaying the operation part in such a way as to move while the finger touches the operation part, and issuing an instruction to execute the predetermined function when the movement is completed.

5. The information processing device according to claim 4, wherein the processor displays the operation part at an original position and stops execution of the function in a case in which the finger is released from the operation part before the movement is completed.

6. The information processing device according to claim 1, wherein the predetermined operation is an operation of tapping a plurality of positions a plurality of times.

7. The information processing device according to claim 6, wherein the processor executes processing of displaying the operation part in such a way as to move according to a distance between two tapped points, and issuing an instruction to execute the predetermined function when the movement is completed.

8. The information processing device according to claim 1, wherein the predetermined operation is an operation of tapping the operation part or the area in which the operation part is movable and then tapping another portion.

9. The information processing device according to claim 8, wherein the predetermined operation is an operation of tapping the operation part or the area in which the operation part is movable and then further tapping a displayed confirmation screen.

10. The information processing device according to claim 1, wherein the predetermined operation is an operation of tapping the operation part or the area in which the operation part is movable with a finger a plurality of times.

11. The information processing device according to claim 10, wherein the processor executes processing of displaying the operation part in such a way as to move according to a number of times of the tapping, and issuing an instruction to execute the predetermined function when the movement is completed.

12. A non-transitory computer-readable storage medium storing an information processing program for causing executable by a computer to execute perform processing, the processing comprising:

displaying, on a display unit, an operation part that receives an operation by a user;

displaying, in a case in which a movement operation of moving the operation part in a selected state is received, the operation part in such a way as to move while following the movement operation, and issuing an instruction to execute a predetermined function by moving the operation part to a predetermined position by the movement operation and then completing the movement operation; and issuing an instruction to execute the predetermined function in a case in which a predetermined operation that is different from each of the movement operation and a single tapping operation performed by the user on the operation part or an area in which the operation part is movable, and that includes an operation of selecting at least one of the operation part or the area in which the operation part is movable, is received, wherein the predetermined operation is an operation of tapping a plurality of positions, wherein one of the plurality of positions is the operation part, and another position is a movement area in which the operation part moves.

* * * * *